(12) United States Patent
Sawada

(10) Patent No.: US 6,882,792 B2
(45) Date of Patent: Apr. 19, 2005

(54) TIME-SHIFT REPLAYING SYSTEM

(75) Inventor: Hideki Sawada, Tokyo (JP)

(73) Assignee: NEC Corporation, Tokyo (JP)

( * ) Notice: Subject to any disclaimer, the term of this patent is extended or adjusted under 35 U.S.C. 154(b) by 546 days.

(21) Appl. No.: 09/996,700

(22) Filed: Nov. 30, 2001

(65) Prior Publication Data
US 2002/0063805 A1 May 30, 2002

(30) Foreign Application Priority Data
Nov. 30, 2000 (JP) ........................................ 2000-364155

(51) Int. Cl.<sup>7</sup> ............................ H04N 5/91; H04N 7/00
(52) U.S. Cl. ........................... 386/46; 386/70; 386/109; 386/110
(58) Field of Search ............................. 386/46, 68–70, 386/109–112; 348/460

(56) References Cited

U.S. PATENT DOCUMENTS 5,371,551 A * 12/1994 Logan et al. ............... 348/571
5,701,383 A * 12/1997 Russo et al. ................... 386/46
6,553,567 B1 * 4/2003 Wugofski et al. .............. 725/81
2002/0057892 A1 * 5/2002 Mano et al. ................... 386/46
2002/0174438 A1 * 11/2002 Cleary et al. ................ 725/100
2002/0184638 A1 * 12/2002 Agnihotri et al. ............. 725/89

FOREIGN PATENT DOCUMENTS

| JP | 6-245157 | 9/1994 |
| JP | 7-250305 | 9/1995 |
| JP | 11-177962 | 7/1999 |
| JP | 11-331721 | 11/1999 |

* cited by examiner

Primary Examiner—Chris Kelley
Assistant Examiner—Alicia M. Duggins
(74) Attorney, Agent, or Firm—Young & Thompson

(57) ABSTRACT

To provide a time-shift replaying system, which includes two time-shift replaying devices and allows two users to watch video image with different time-shift periods at the same time. Especially, one of the time-shift replaying device functions as a server, and the another functions as a client, which is simplified its structure and at low cost by comparison with the time-shift replaying device functioning as a server.

8 Claims, 7 Drawing Sheets

TIME-SHIFT REPLAYING SYSTEM

BACKGROUND OF THE INVENTION

The present invention relates to a time-shift replaying system, especially to a time-shift replaying system having a time-shift replaying device equipped with a tuner and a time-sift replaying device equipped with no tuner.

There is a conventional time-shift replaying system, which subjects a TV signal and an external input signal from a video deck or the like to a digital compression and coding in real time, then stores it in a recording unit while a digital code being stored is expanded at a predetermined time, and reproduces the digital code being expanded after being time-shifted.

Referring to FIG. 7, the conventional time-shift replaying system includes an antenna terminal 1001, a tuner 1002, an A/D converter 1003, a compressor 1004, a storage device 1005, an expander 1006, a D/A converter 1007, and a display device 1008.

In this conventional system, video signals entered from the antenna terminal 1001 are converted into analog signals, notably NTSC signals in the tuner 1002 and are then converted into digital signals in an A/D converter 1003, followed by subjecting them to a digital compression and coding in the compressor 1004. The resulting digital compression codes are stored in a storage device 1005. After retardation for a predetermined time, it is expanded to the pre-compression digital signal by the expander 1006 and is then converted into an analog signal by the D/A converter 1007, followed by being displayed on the display device 1008.

Here, in the conventional system described above, in case where two users want to replay video image with their own time-shift periods at the same time, the users must prepare two sets of this conventional system.

SUMMARY OF THE INVENTION

An object of the present invention is to provide a time-shift replaying system, which includes two time-shift replaying devices and allows two users to watch video image with different time-shift periods at the same time. Especially, one of the time-shift replaying device functions as a server, and the another functions as a client, which is simplified its structure and at low cost by comparison with the time-shift replaying device functioning as a server.

According to the present invention, a time-shift replaying system includes a first time-shift replaying device and second time-shift replaying device, which has no tuner. The first time-shift replaying device includes a tuner receiving video signal, a storage unit temporarily storing a pre-set time period of video signal as digital code, a first read unit reading the video signal from the storage unit after the elapse of a first time-shift period based on a first pointer, a time-shift control unit setting the first pointer according to information of the first time-shift period entered by a user, a first display displaying video image after the elapse of the first time-shift period based on the video signal read by the first read unit, and a first communication unit. The second time-shift replaying device includes a second communication unit, a second read unit reading the video signal from the storage unit via the first and second communication units after the elapse of a second time-shift period based on a second pointer set by the time-shift control unit based on information of the second time-shift period entered by a user via the first and second communication units, and a second display displaying video image after the elapse of the second time-shift period based on the video signal read by said second read unit.

BRIEF DESCRIPTION OF THE DRAWINGS

These and other objects, features and advantages of the invention will become more apparent from the following detailed description when taken in conjunction with the accompanying drawings, in which.

In the drawings, the same reference numerals represent the same structural elements.

DESCRIPTION OF THE PREFERRED EMBODIMENTS

Next, the present invention will be explained in detail below in reference to the accompanying drawings.

Figure 1:
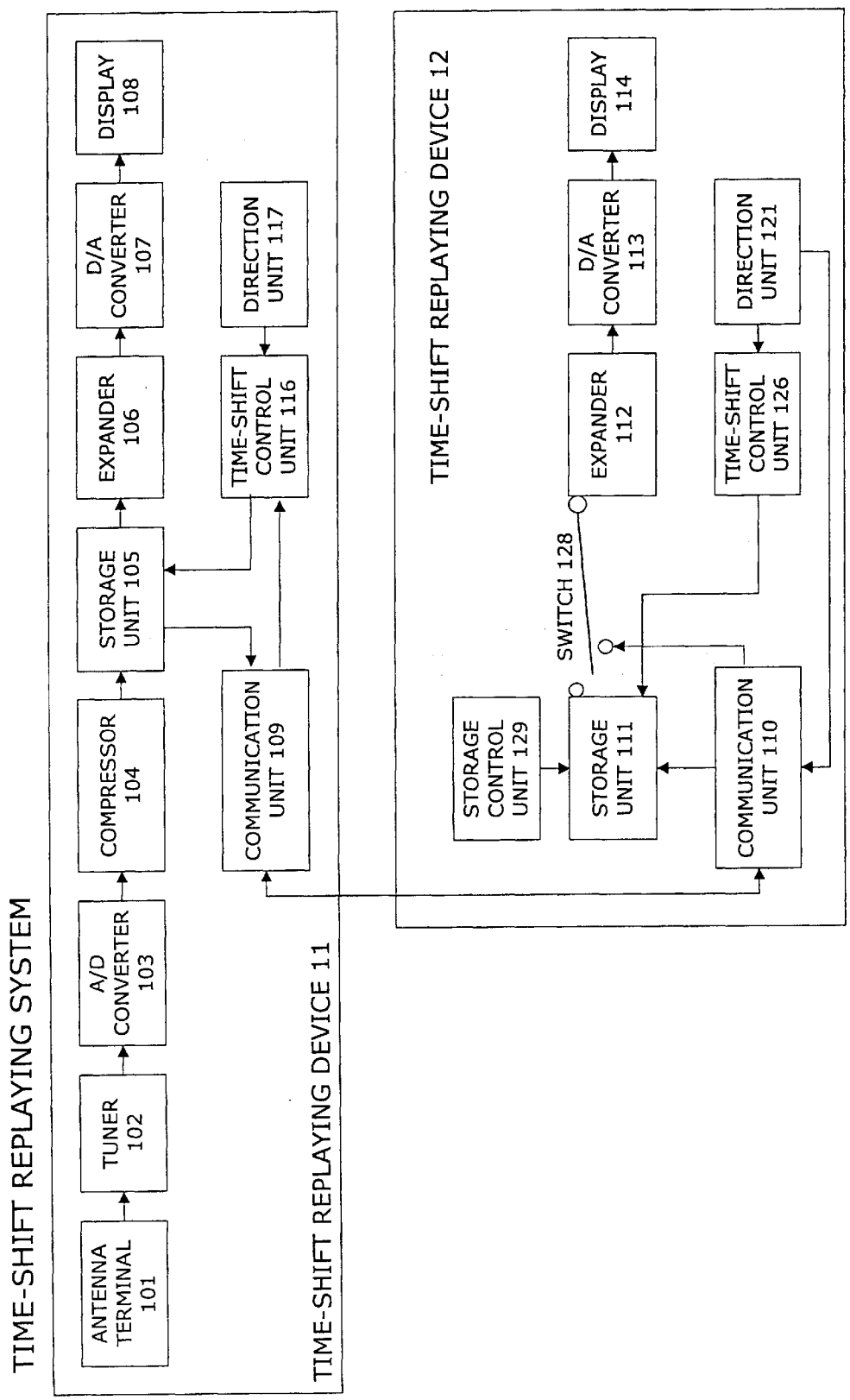
FIG. 1 is a block diagram illustrating a first embodiment of the present invention.

Referring to FIG. 1, a time-shift replaying system of a first embodiment of the present invention includes a time-shift replaying device 11 and a time-shift replaying device 12, which is connected to the time-shift replaying device 11.

The time-shift replaying device 11 includes an antenna terminal 101, a tuner 102, an A/D converter 103, a compressor 104, a storage unit 105, an expander 106, a D/A converter 107, a display 108, a communication unit 109, a time-shift control unit 116 and a direction unit 117.

The tuner 102 receives video signal through the antenna terminal 101 and decodes the signal into analog video signal such as NTSC signal. The A/D converter 103 converts the analog video signal into digital video signal. The compressor 104 compresses an information content of the digital video signal. The storage unit 105 temporarily stores the compressed digital video signal, which corresponds to a pre-set time period of the video signal, as digital code. The time-shift control unit 116 sets the pre-set time period in conformity with the bit rate of the digital compression and the free space of the storage unit 105, and sets a first time-shift period and a second time-shift period. The expander 106 reads the compressed and coded digital video signals from the storage unit 105 after the elapse of the first time-shift period and expands the compressed and coded digital video signal. The direction unit 117 controlled by a user of the time-shift playing device 11 provides the time-shift control unit 116 with information of the first time-shift period. The D/A converter 107 converts the expanded digital signal into analog video signal. The display 108 displays video image according to the analog signal. The communication unit 109 controls input and output of the compressed and coded digital video signal stored in the storage unit 105 and control signals for controlling to the time-shift replaying device 12.

The time-shift replaying device 12 includes a communication unit 110, a storage unit 111, an expander 112, a D/A converter 113, a display 114, a direction unit 121, a time-shift control unit 126, a switch 128, and a recording control unit 129.

The communication unit 110 communicates with the communication unit 109. The storage unit 111 temporarily stored a pre-set time period of the compressed and coded digital video signal transmitted from the storage unit 105 via communication units 109 and 110. The time-shift control unit 126 sets the pre-set time period, based on the bit rate of digital compression by the compressor 104 and the free space of the storage unit 111, and sets second time-shift period. The expander 112 reads the compressed and coded digital video signal from the storage unit 105 or 111 based on the state of the switch 128 after the elapse of the second time-shift period set by the time-shift control unit 116 or 126, and expands the compressed and coded digital video signal. The switch 128 directed by the direction unit 121 connects the storage unit 111 and the expander 112, or the communication unit 110 and expander 112 in order to connect the storage unit 105 and the expander 112. The direction unit 121 controlled by the user of the time-shift playing device 12 provides the time-shift control unit 116 with information of the second time-shift period, if the switch 128 connects the communication unit 110 and the expander 112. On the other hand, the direction unit 121 provides the time-shift control unit 126 with information of the second time-shift period, if the switch 128 connects the storage unit 111 and expander 112. The D/A converter 113 converts the expanded digital video signal into analog video signal. The display 108 displays video image according to the analog video signal. The recording control unit 129 controls the storage unit 111.

Next, the operation of the time-shift replaying device 11 will be described in detail.

Referring to FIG. 1, the tuner 102 decodes video signal entered from the antenna terminal 101 into analog video signal. Then, the A/D converter 103 converts the analog video signal into digital video signal. Then, the compressor 104 compressed an information content of the digital video signal. Then, the compressed digital video signal, which corresponds to the pre-set time period, set by the time-shift control unit 116, of the video signal, is stored in the storage unit 105 as digital code, temporarily.

Here, the maximum time period "MaxTime[s]" of the video signal that allows a temporary storage in the storage unit 105 can be represented by the following formula (1) where the bit rate of the digital compressed code denotes "BitRate[bit/s]" and the free space of the storage unit 105 denotes "FreeSpace[bit]".

MaxTime=FreeSpace/BitRate (1)

For example, if the bit rate is 1M [bit/s] and the free space is 3600 M [bit], the maximum time period that allows a temporary storage is 3,600 seconds, i.e., one hour from the equation (1).

Figure 2:
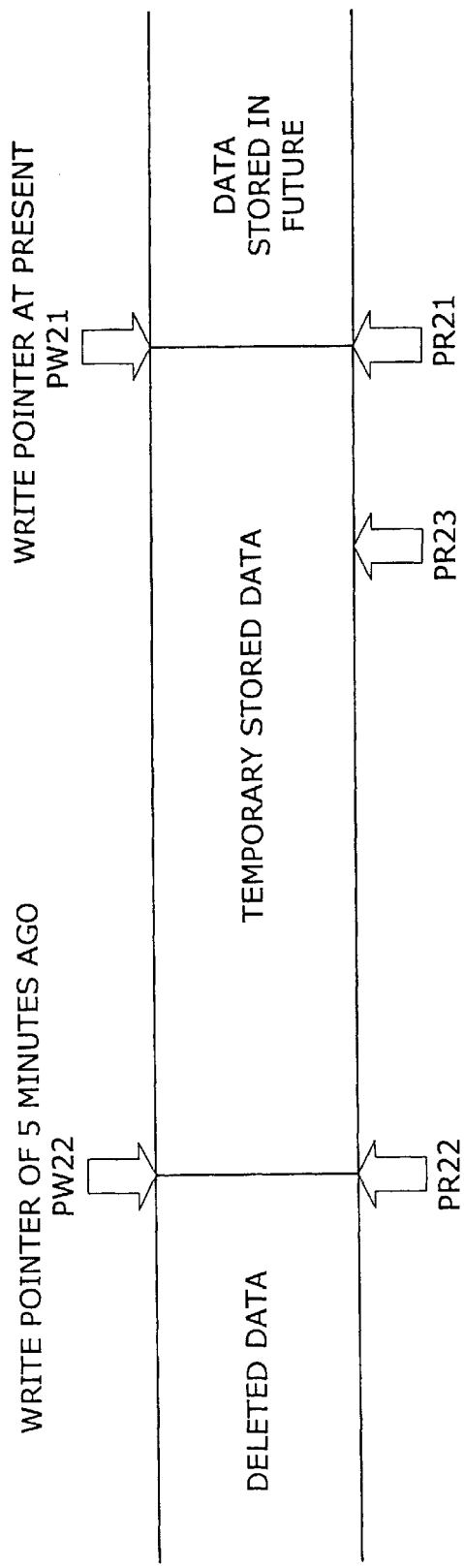
FIG. 2 is a conceptual diagram, which explains to store data and read data.

FIG. 2 illustrates a state of setting the pre-set time period corresponding to the video signal to be temporarily stored in the storage unit 105 to 5 minutes.

PW21 in FIG. 2 represents a write pointer in storage unit 105, which indicates a portion where the compressed and coded digital video signal outputted from the compressor 104 is just written. PW22 in FIG.2 represents a write pointer which indicates a portion where the compressed and coded digital video signal was written 5 minutes ago. Therefore, time is flowing from the left to the right in FIG. 2.

In this case, any earlier the compressed and coded digital video signal stored in the storage unit 105 at more than 5 minutes ago, i.e., at a time earlier than the write pointer PW22 is deleted from the storage unit 105 one by one.

Therefore, the storage unit 105 temporary stores the compressed and coded digital video signal for 5 minutes from the write pointer PW22 to the write pointer PW21, consistently.

By the way, the compressed and coded digital video signal temporary stored in the storage unit 105 can be stored in another storage area if required, i.e., video recording.

Next, the expander 106 starts to read the compressed and coded digital video signal stored in the storage unit 105 after the elapse of the first time-shift period according to a first read pointer set by the time-shift control unit 116, and then expands the compressed and coded digital video signal. Then, the D/A converter 107 converts the expanded digital video signal into an analog video signal. Then, the display 108 displays video image based on the analog video signal.

Here, in case that the first time-shift period is zero (namely real-time play), the expander 106 starts to read the compressed and coded digital video signal from a read pointer PR21 in FIG. 2. The read pointer PR21 is set by the time-shift control unit 116. In sum, according to the read pointer PR21, the expander 106 starts to read the compressed and coded digital video signal at the same time as the storage unit 105 stores the compressed and coded digital video signal.

On the other hand, in case that the first time-shift period is 5 minutes, the expander 106 starts to read the compressed and coded digital video signal from a read pointer PR22 set by the time-shift control unit 116. In sum, according to the read pointer PR22, the expander 106 starts to read the compressed and coded digital video signal which is stored in the storage unit 105 5 minutes ago. Therefore, the user of the time-shift playing device 11 can watch the video image with the delay in 5 minutes.

In above-described case, the first time-shift period can be set within the range of zero to 5 minutes (PR21 to PR22) by the user through the direction unit 117.

Next, the operation of the time-shift replaying device 12 will be described in detail.

Firstly, there are two kinds of ways of replaying video signal by the time-shift replaying device 12.

In the first way, the switch 128 connects the communication unit 110 and expander 112.

The user of the time-shift playing device 12 operates the direction unit 121, and sets a second time-shift period.

The time-sift control unit 116 sets a second read pointer, for example, a read pointer PR23 in FIG. 2, based on information of the second time-shift period transmitted from the direction unit 121 via communication units 110 and 109. The read pointer PR23 can be set within the range of PR21 to PR22. Therefore, in this way, the time-shift control unit 126 does not perform anything.

Then, according to the read pointer PR23, the expander 112 start to read the compressed and coded digital video signal stored in the storage unit 105 via communication units 109 and 110 after the elapse of the second time-shift period, and then expands the compressed and coded signal. Then, the D/A converter 113 converts the expanded digital video signal into analog video signal. Then, the display 114 displays video image based on the analog video signal. The user of the time-shift playing device 12 can watch the video image with the delay in the second time-shift period.

Thus, the time-shift replaying devices 11 and 12 can perform their own time-shift operation with their own time-shift periods at the same time.

Further, in the first way, even though there is no sufficient free space for storing the compressed and coded digital video signal in the storage unit 111, the time-shift operation can be allowed in the time-shift replaying device 12 just as in the case with the time-shift replaying device 11.

Next, the second way of the operation of the time-shift replaying device 12 will be described.

In the second way, the switch 128 connects the storage unit 111 and expander 112. Therefore, the compressed and coded video signal stored in the storage unit 105 is transmitted to the storage unit 111 via the communication units 109 and 110, and temporarily stored in the storage unit 111.

Here, a pre-set time of video image temporarily storing in the storage unit 111 as the compressed and coded video signal is determined by the free space of the storage unit 111. Namely, if the free space of the storage unit 111 is larger than that of the storage unit 105, the preset time in the storage unit 115 is longer than that in the storage unit 105. Therefore, the second time-shift period set by the user of the time-shift replaying device 12 can be longer than the first time-shift period set by the user of the time-shift replaying device 11.

The user of the time-shift playing device 12 operates the direction unit 121, and sets the second time-shift period.

The time-sift control unit 126 sets a second read pointer based on information of the second time-shift period transmitted from the direction unit 121 in the same way as the time-shift control unit 116 does.

Then, according to the second read pointer, the expander 112 start to read the compressed and coded digital video signal stored in the storage unit 111 after the elapse of the second time-shift period, and then expands the compressed and coded signal.

Then, the D/A converter 113 converts the expanded digital video signal into analog video signal.

Then, the display 114 displays video image based on the analog video signal.

In the second way, the time-shift replaying devices 11 and 12 can perform their own time-shift operation with their own time-shift periods at the same time, too.

By the way, if there is a sufficient free space for storing the compressed and coded digital video signal in the storage unit 111, the compressed and coded digital video signal transmitted from the storage unit 105 may be lastingly stored in the storage unit 111 on the basis of the control of the recording control unit 129. The stored compressed and coded video signal can be reproduced in response to the user's request.

Figure 3:
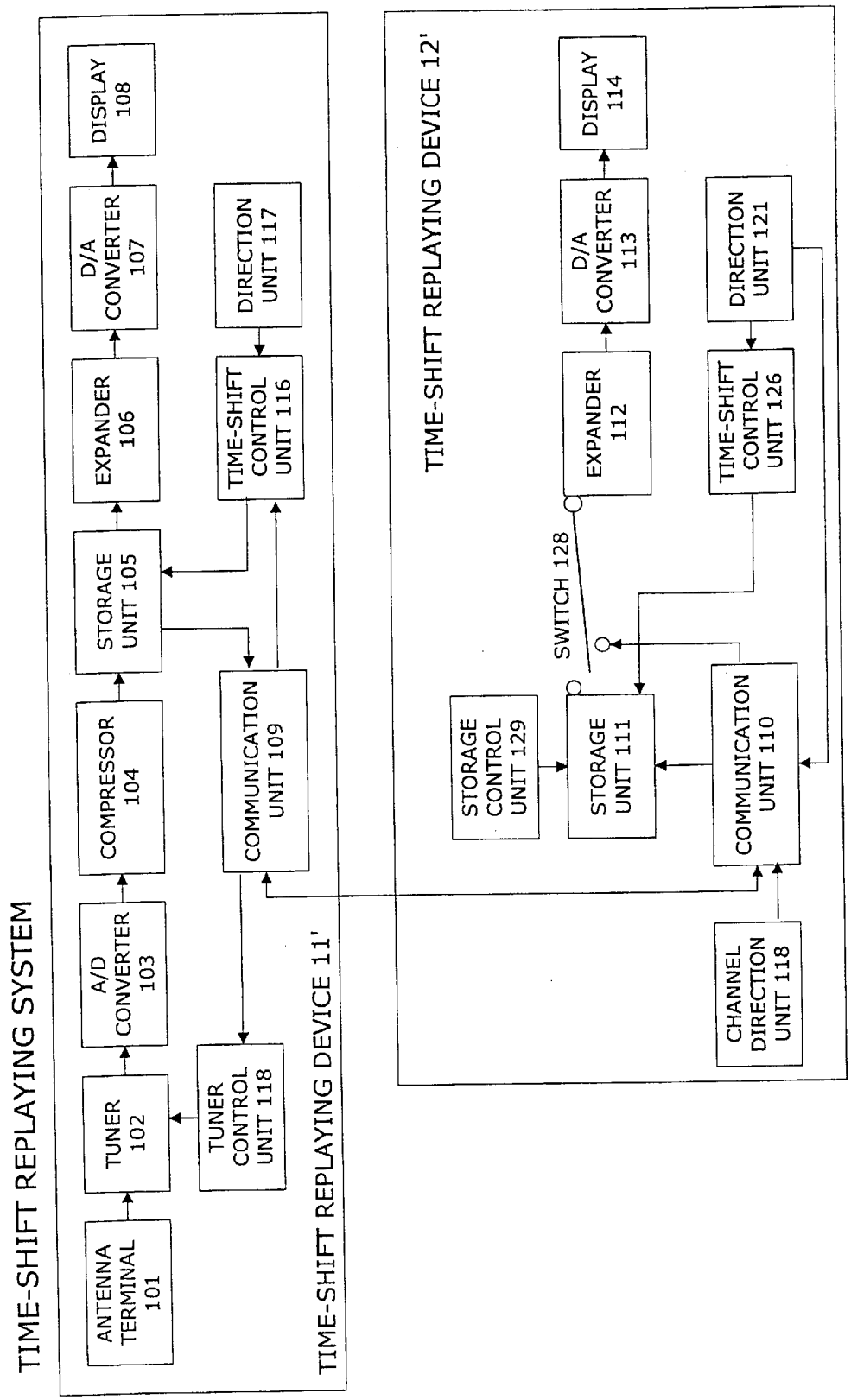
FIG. 3 is a block diagram illustrating the first embodiment of the present invention.

Further, as shown in FIG. 3, the time-shift replaying device 11 explained in FIG. 1 may include a tuner control unit 118, and the time-shift replaying device 12 explained in FIG. 1 may include channel direction unit 130.

The tuner control unit 118 controls the tuner 102 and change the current channel into the other according to an instruction of the channel direction unit 130, which is operated by the user of the time-shift playing device 12, via the communication units 110 and 109. In sum, the time-shift replaying device 12 having no tuner can operates to change the channel.

As described above, in the first embodiment of the present invention, the time-shift replaying system includes two time-shift replaying devices 11 and 12. In the time-shift replaying system, the time-shift replaying device 11, which has the tuner 102, functions as a server, and the time-shift replaying device 12, which does not have a tuner, functions as a client.

Figure 4:
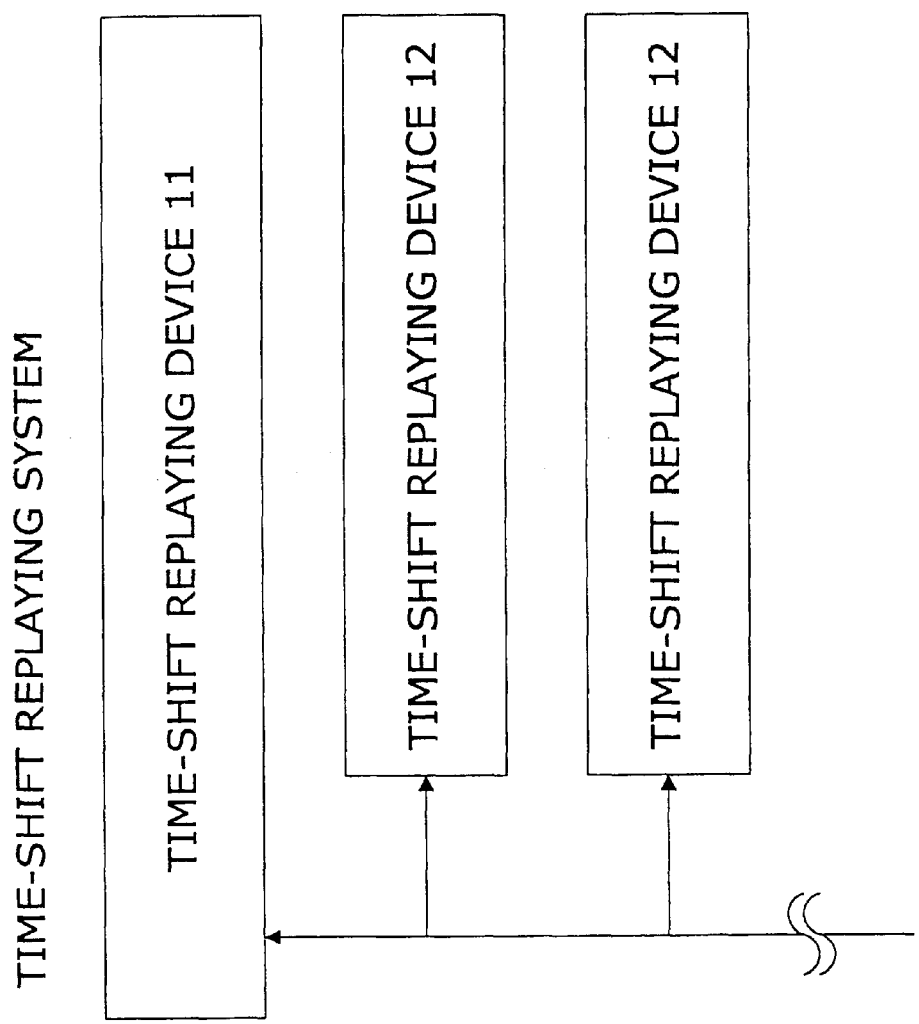
FIG. 4 is a block diagram illustrating the first embodiment of the present invention.

Alternatively, as shown in FIG. 4, the time-shift replying system may include two or more time-shift replaying devices 12, each of which functioning as client. Thereby, each of the time-shift replaying devices 12 can perform the time-shift replaying operation, based on different time-shift period.

Next, a second embodiment of the present invention will be described in detail.

Figure 5:
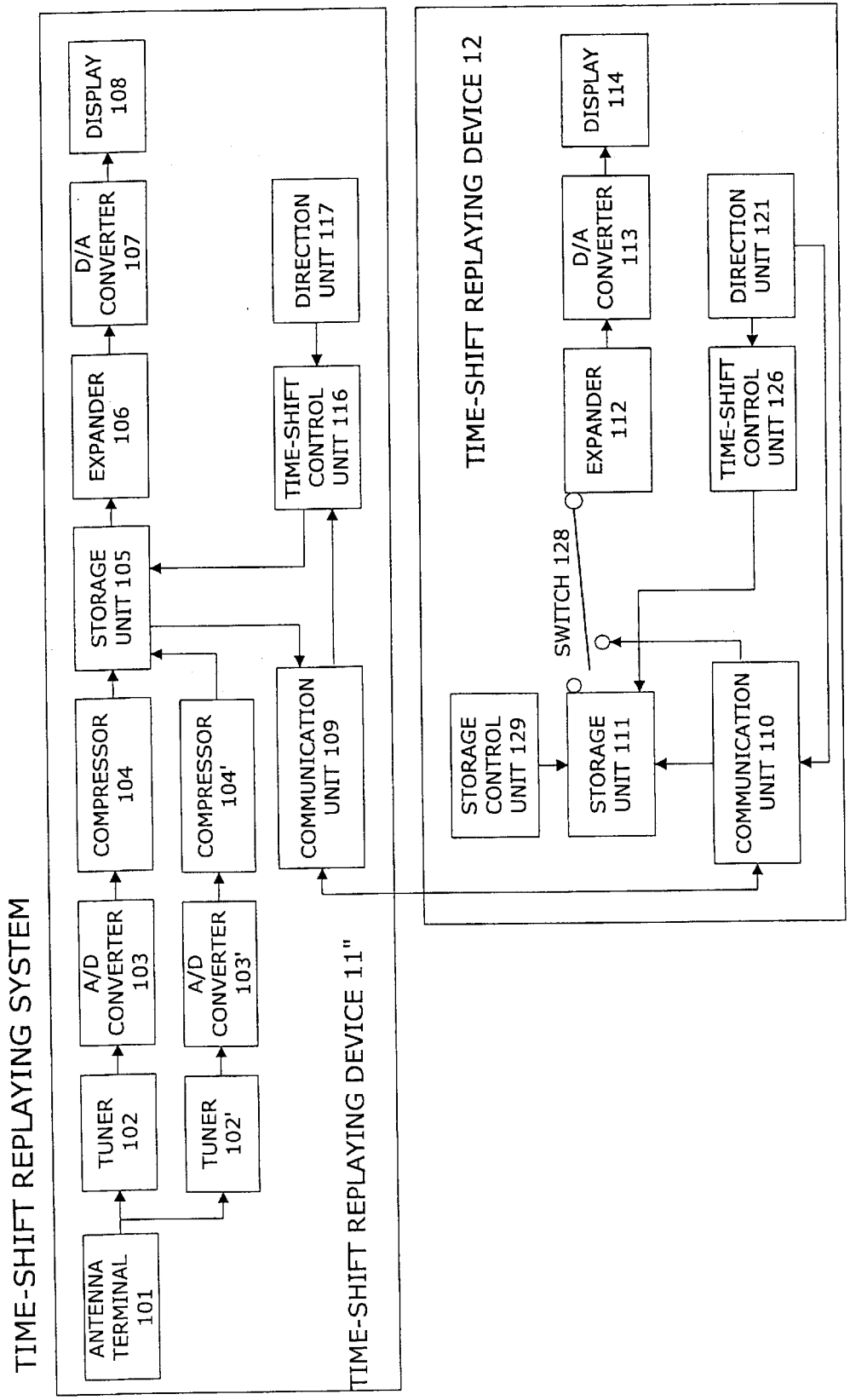
FIG. 5 is a block diagram illustrating a second embodiment of the present invention.

Referring to FIG. 5, a time-shift replaying system of this embodiment includes a time-shift replaying device 11" and a time-shift replaying device 12. The time-shift replaying device 11' includes two tuners 102 and 102', two A/D converters, 103 and 103', and two compressors 104 and 104'.

In this embodiment, video signals entered from the antenna terminal 101 are decoded into analog video signal of a first channel in the tuner 102, and are also decoded into video signal of a second channel in the tuner 102'. Then, the A/D converter 103 converts the analog video signal of the first channel into digital video signal. Similarly, the A/D converter 103' converts the analog video signal of the second channel into digital video signal. Then, the compressor 104 compressed an information content of the digital video signal of first channel. Similarly, the compressor 104' compressed an information content of the digital video signal of second channel.

Then, the compressed digital video signal of first channel, which corresponds to a pre-set time period, set by the time-shift control unit 116, of the video signal, is stored in the storage unit 105 as digital code, temporarily. Similarly, the compressed digital video signal of second channel, which corresponds to a pre-set time period, set by the time-shift control unit 116, of the video signal, is stored in the storage unit 105 as digital code, temporarily.

Then, the expander 106 starts to read either of the compressed and coded digital video signal of the first channel or the compressed and coded digital video signal of the second channel, which are temporary stored in the storage unit 105, according to a first pointer set by the time-shift control unit 116 based on the direction unit 117, after the elapse of a first time-shift period, and then, expands the selected compressed and coded digital video signal. Therefore, the user of the time-shift playing device 11" operates the direction unit 117 in order to select the channel and set the first time-shift period.

Then, the D/A converter 107 converts the expanded digital video signal into an analog video signal. Then, the display 108 displays video image of the selected channel based on the analog video signal.

Thus, the user of the time-shift playing device 11" can watch the video image of the selected channel with the delay in the first time-shift period.

In the time-shift replaying device 11", the respective compressed and coded digital compressed codes of the first and second channels may be additionally stored, i.e., video-recorded in another storage area as necessity.

On the other hand, in the time-shift replaying device 12, a user operates direction unit 121, choose channel, set a second time-shift period, and control the switch 128.

Then, in case that the switch 128 connects the communication unit 110 and the expander 112, the time-shift control unit 116 directed by the direction unit 121 sets a second read pointer on the selected compressed and coded digital video signal stored in the storage unit 105.

Then, the selected compressed and coded digital video signal is displayed on the display 114 as video image after the elapse of the second time-shift period through the communication units 109 and 110, the expander 112, and the D/A converter 113.

On the other hand, in case that the switch 128 connects the storage unit 111 and the expander 112, the time-shift control unit 126 sets a second read pointer on the selected compressed and coded digital video signal transmitted from the storage unit 105 and stored in the storage unit 111. Here, the storage unit 111 stores both the compressed and coded video signal corresponding to the tuners 102 and 102' or selected one.

Then, the selected compressed and coded digital video signal is displayed on the display 114 as video image after the elapse of the second time-shift period through the expander 112 and the D/A converter 113.

Thus, the users of the time-shift control devices 11" and 12 can watch the different channels respectively with their own time-shift periods at the same time.

In this embodiment, the storage unit 111 may store, i.e., video-record, the compressed and coded digital video signal (s) of the first channel or/and the second channel, lastingly.

Thereby, the user watch one channel by the time-sift replaying device 11" (12) while the time-shift replaying device 12 (11") records another channel.

Figure 6:
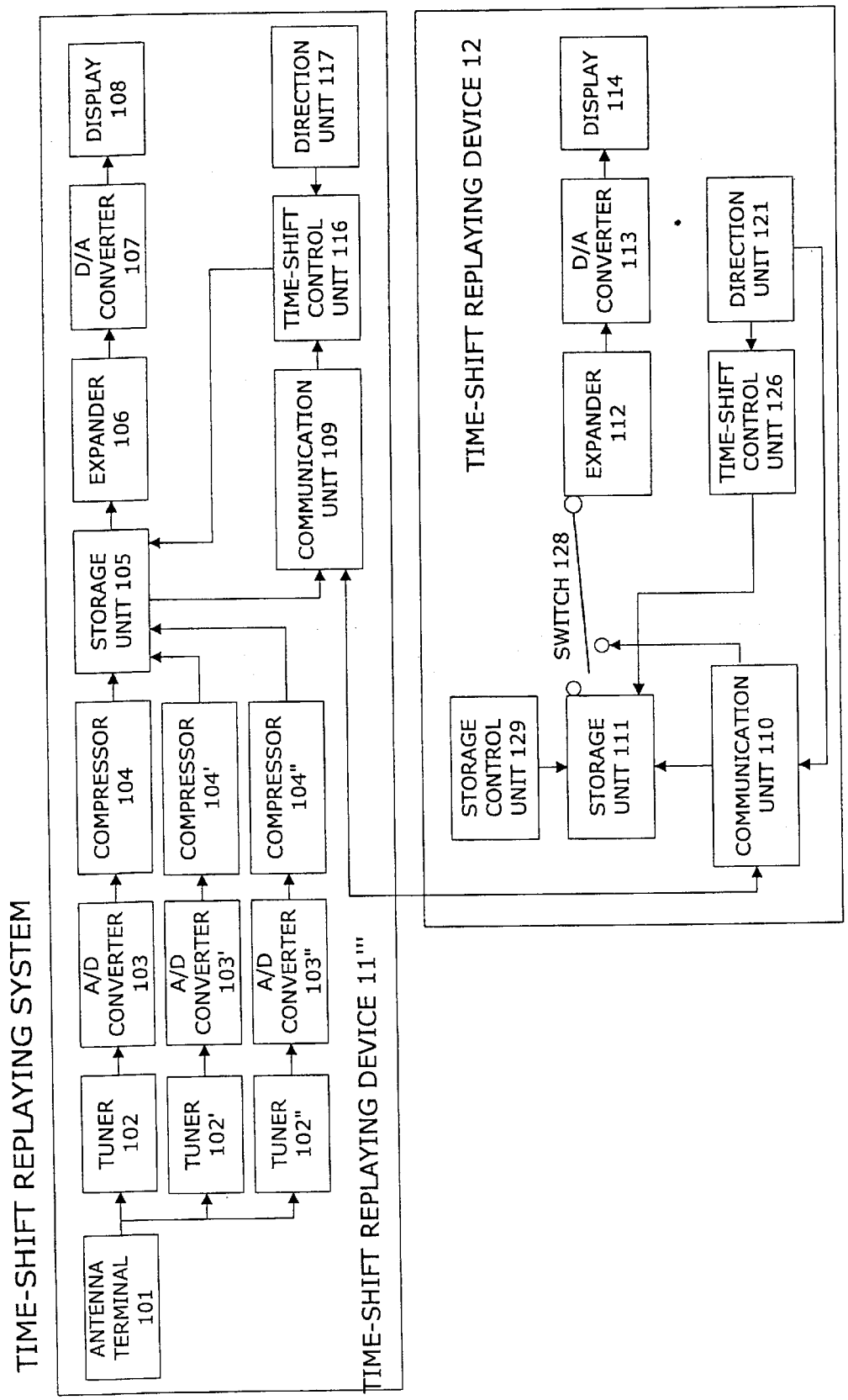
FIG. 6 is a block diagram illustrating the second embodiment of the present invention.
Figure 7:
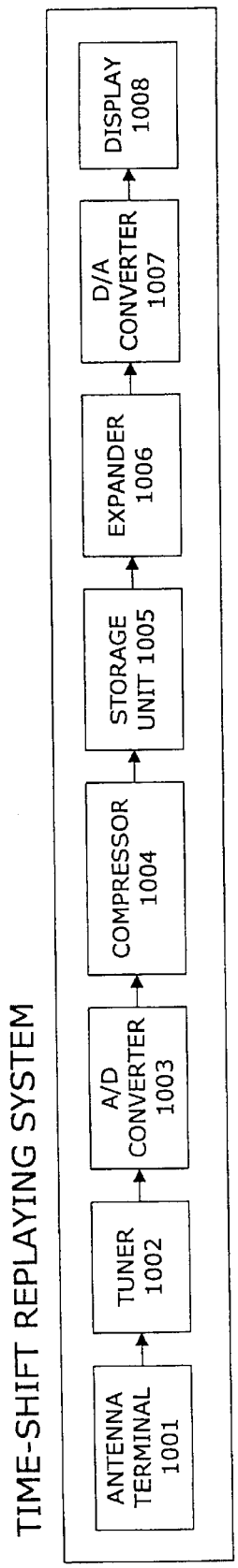
FIG. 7 is a block diagram illustrating a conventional system.

In the above explanation of the second embodiment, the time-shift replaying device 11" has two sets of tuners, A/D converters, and compressors. However, as shown in FIG. 6, a time-shift device 11" explained in FIG. 5 may have three or more set of tuners, A/D converters, and compressors.

Further, two or more time-shift replaying devices 12 may connect to the time-shift replaying device 11" in the same way as the time-shift replaying system as shown in FIG. 4.

In the embodiments described above, the time-shift replaying devices may be a personal computer. A compression algorithm to be used in the compressor may be an international standard such as the MPEG standard. An elongation algorithm by the expander corresponds to the compression algorithm of the compressor. The storage unit may be for example a hard disk or an optical disk. A standard of a network between communication units may be, for example, Ethernet, USB, or IEEE 1394.

According to the present invention, in a time-shift replaying system, which includes two time-shift replaying devices and allow two users to watch video image with different time-shift periods at the same time, one time-shift replaying device can be simplified its structure and at low cost by comparison with another the time-shift replaying device. Because, as the simplified time-shift replaying device is connected to another one, waste units in the simplified one can be eliminated.

While this invention has been described in conjunction with the preferred embodiment described above, it will now be possible for those skilled in the art to put this invention into practice in various other manners.

What is claimed is:

1. A time-shift replaying system comprising:
    a first time-shift replaying device, which comprises a tuner receiving video signal, a storage unit temporarily storing a pre-set time period of video signal as digital code, a first read unit reading said video signal from said storage unit after the elapse of a first time-shift period based on a first pointer, a time-shift control unit setting said first pointer according to information of said first time-shift period entered by a user, a first display displaying video image after the elapse of said first time-shift period based on said video signal read by said first read unit, and a first communication unit; and
    a second time-shift replaying device having no tuner, which comprises a second communication unit, a second read unit reading said video signal from said storage unit via said first and second communication units after the elapse of a second time-shift period based on a second pointer set by said time-shift control unit based on information of said second time-shift period entered by a user via said first and second communication units, and a second display displaying video image after the elapse of said second time-shift period based on the video signal read by said second read unit.

2. The time-shift replaying system claimed in claim 1, wherein said first time-shift replaying device further comprises a tuner control unit and said second time-shift replaying device further comprised a channel direction unit; and
    wherein said tuner control unit controls said tuner and changes a current channel into the other according to an instruction of said channel direction unit.

3. A time-shift replaying system comprising:
    a first time-shift replaying device, which comprises a tuner receiving video signal, a first storage unit temporarily storing a pre-set time period of video signal as digital code, a first read unit reading said video signal from said first storage unit after the elapse of a first time-shift period based on a first pointer, a first time-shift control unit setting said first pointer according to information of said first time-shift period entered by a user, a first display displaying video image after the elapse of said first time-shift period based on said video signal read by said first read unit, and a first communication unit; and
    a second time-shift replaying device having no tuner, which comprises a second communication unit, a second storage unit temporarily storing a pre-set time period of said video signal transmitted from said first storage unit via said first and second communication units as digital code, a second read unit reading said video signal from said second storage unit after the elapse of a second time-shift period based on a second pointer, a second time-shift control unit setting said second pointer according to information of said second time-shift period entered by a user, and a second display displaying video image after the elapse of said second time-shift period based on the video signal read by said second read unit.

4. The time-shift replaying system claimed in claim 3, wherein said first time-shift replaying device further comprises a tuner control unit and said second time-shift replaying device further comprised a channel direction unit; and
    wherein said tuner control unit controls said tuner and changes a current channel into the other according to an instruction of said channel direction unit.

5. The time-shift replaying system claimed in claim 3,
    wherein said second time-shift replaying device further comprises a switch having a first state where said switch connects said second storage unit and said second read unit and second state where said switch connects said second communication unit and said second read unit, and
    wherein, said second read unit reads said video signal from said first storage unit via said first and second communication units after the elapse of a third time-shift period based on a third pointer set by said first time-shift control unit based on information of said third time-shift period entered by a user via said first and second communication units, if said switch is said second state.

6. A time-shift replaying system comprising:
    a first time-shift replaying device, which comprises a first tuner receiving first video signal, a second tuner receiving second video signal, a storage unit temporarily storing a pre-set time period of said first video signal and a pre-set time period of said second video signal as digital code, a first read unit reading said either video signal from said storage unit after the elapse of a first time-shift period based on a first pointer, a time-shift control unit setting said first pointer according to information of said first time-shift period and select channel entered by a user, a first display displaying video image corresponding to said select channel after the elapse of said first time-shift period based on said video signal read by said first read unit, and a first communication unit; and a second time-shift replaying device having no tuner, which comprises a second communication unit, a second read unit reading either video signal from said storage unit via said first and second communication units after the elapse of a second time-shift period based on a second pointer set by said time-shift control unit based on information of said second time-shift period and select channel entered by a user via said first and second communication units, and a second display displaying video image after the elapse of said second time-shift period based on the video signal corresponding to said select channel read by said second read unit.

7. A time-shift replaying system comprising:

a first time-shift replaying device, which comprises a first tuner receiving first video signal, a second tuner receiving second video signal, a storage unit temporarily storing a pre-set time period of said first video signal and a pre-set time period of said second video signal as digital code, a first read unit reading said either video signal from said storage unit after the elapse of a first time-shift period based on a first pointer, a time-shift control unit setting said first pointer according to information of said first time-shift period and select channel entered by a user, a first display displaying video image corresponding to said select channel after the elapse of said first time-shift period based on said video signal read by said first read unit, and a first communication unit; and a second time-shift replaying device having no tuner, which comprises a second communication unit, a second storage unit temporarily storing a pre-set time period of said first and/or second video signal transmitted from said first storage unit via said first and second communication units as digital code, a second read unit reading either video signal from said second storage unit after the elapse of a second time-shift period based on a second pointer, a second time-shift control unit setting said second pointer according to information of said second time-shift period and select channel entered by a user, and a second display displaying video image corresponding to said select channel after the elapse of said second time-shift period based on the video signal read by said second read unit.

8. The time-shift replaying system claimed in claim 7, wherein said second time-shift replaying device further comprises a switch having a first state where said switch connects said second storage unit and said second read unit and second state where said switch connects said second communication unit and said second read unit, and wherein, said second read unit reads either video signal from said first storage unit via said first and second communication units after the elapse of a third time-shift period based on a third pointer set by said first time-shift control unit based on information of said third time-shift period and a select channel entered by a user via said first and second communication units, if said switch is said second state.

* * * * *